Feb. 5, 1946.        R. B. HITCHCOCK ET AL        2,394,058
                        ENSILAGE BLOWER
                Filed July 22, 1944        3 Sheets-Sheet 2
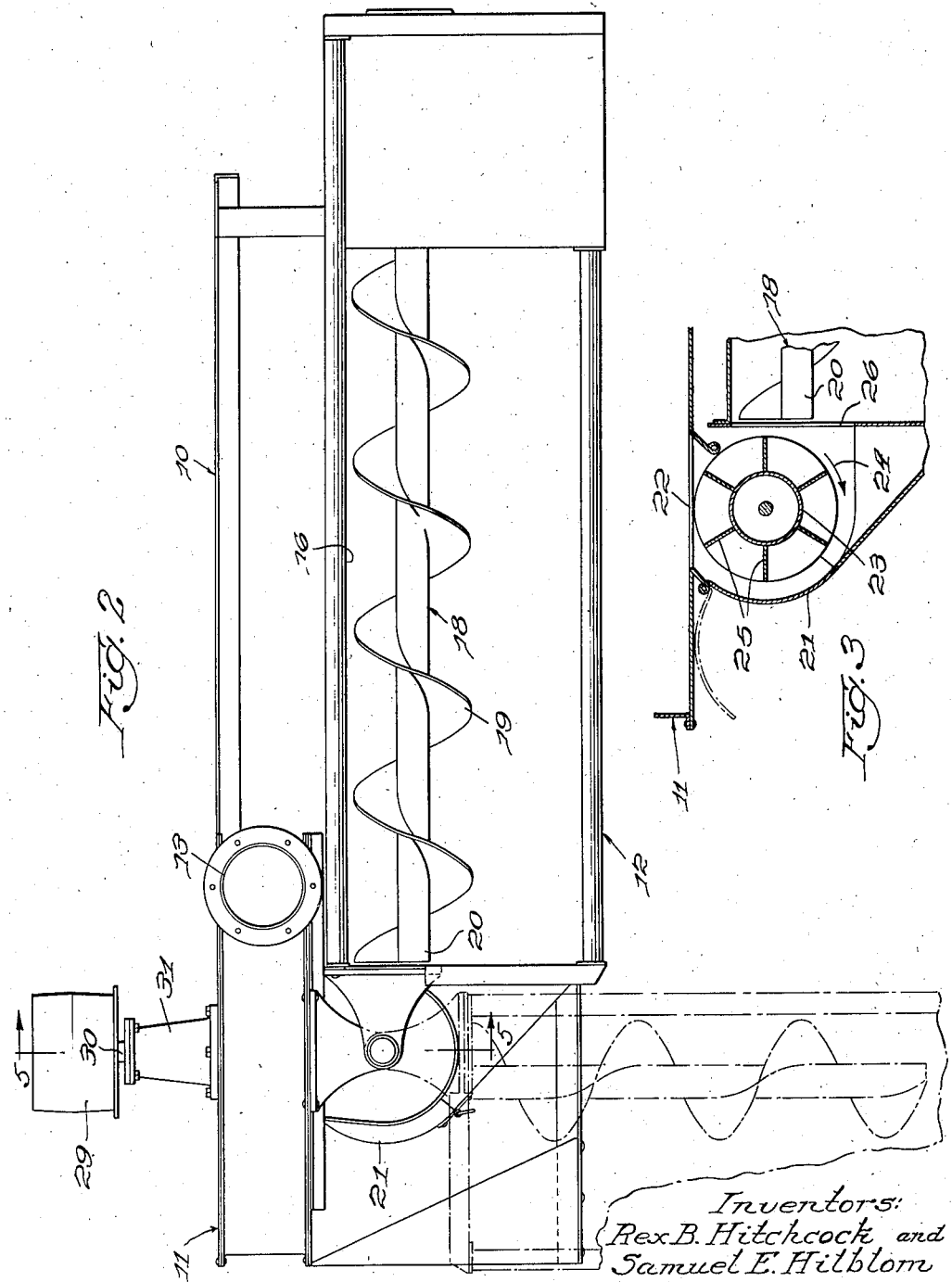
Inventors:
Rex B. Hitchcock and
Samuel E. Hilblom
By: Paul O. Pippel
Atty.

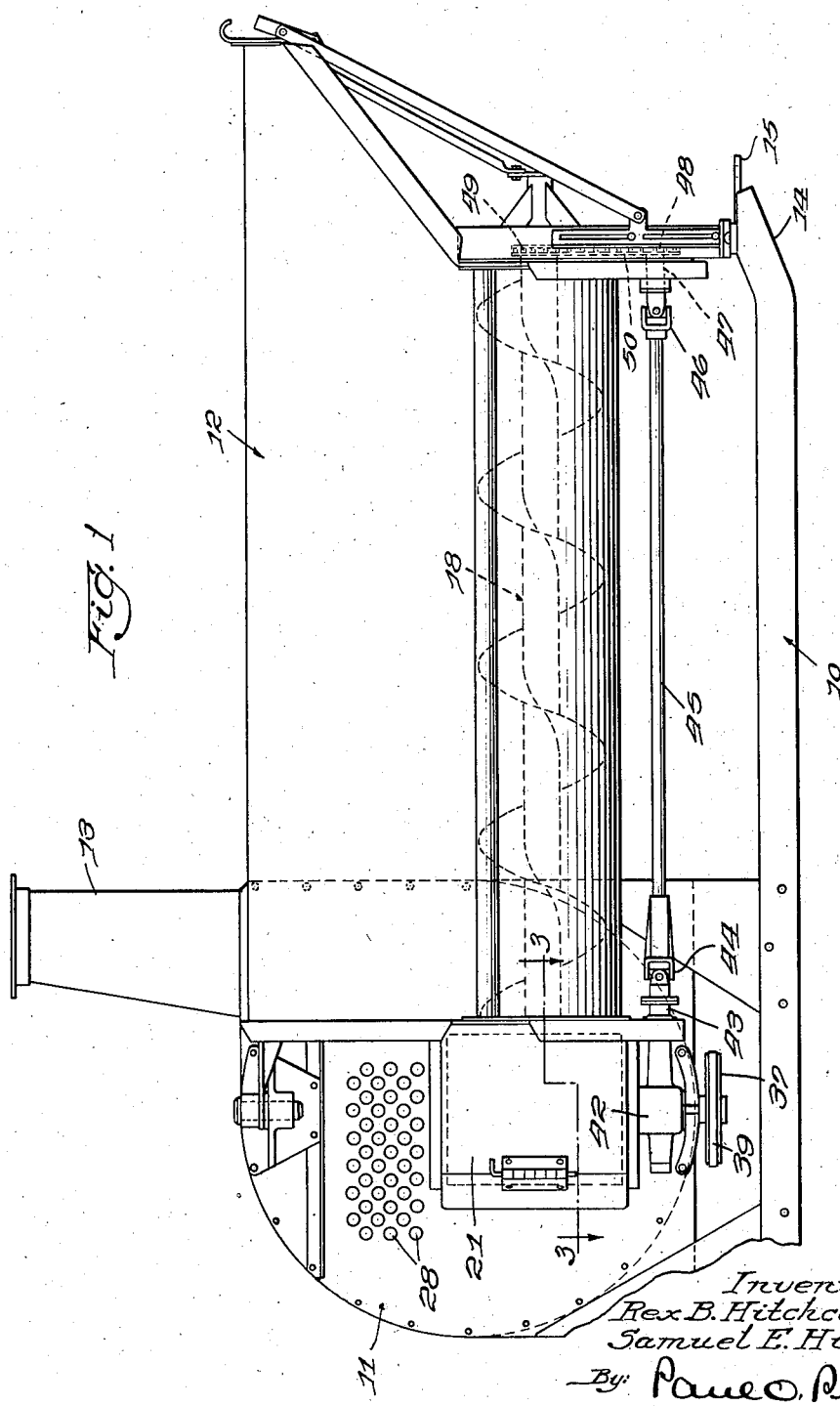

Feb. 5, 1946.      R. B. HITCHCOCK ET AL      2,394,058
ENSILAGE BLOWER
Filed July 22, 1944      3 Sheets-Sheet 3
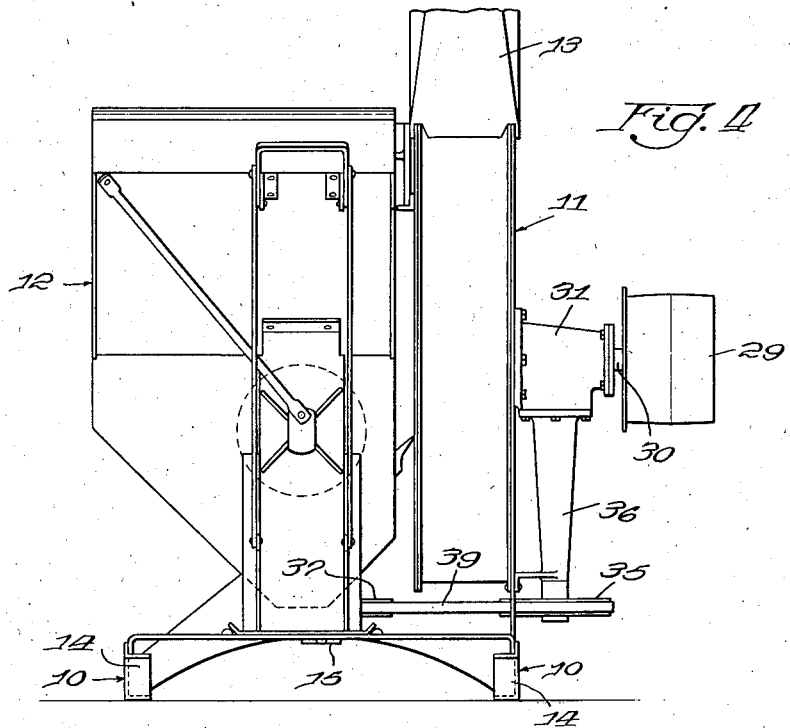
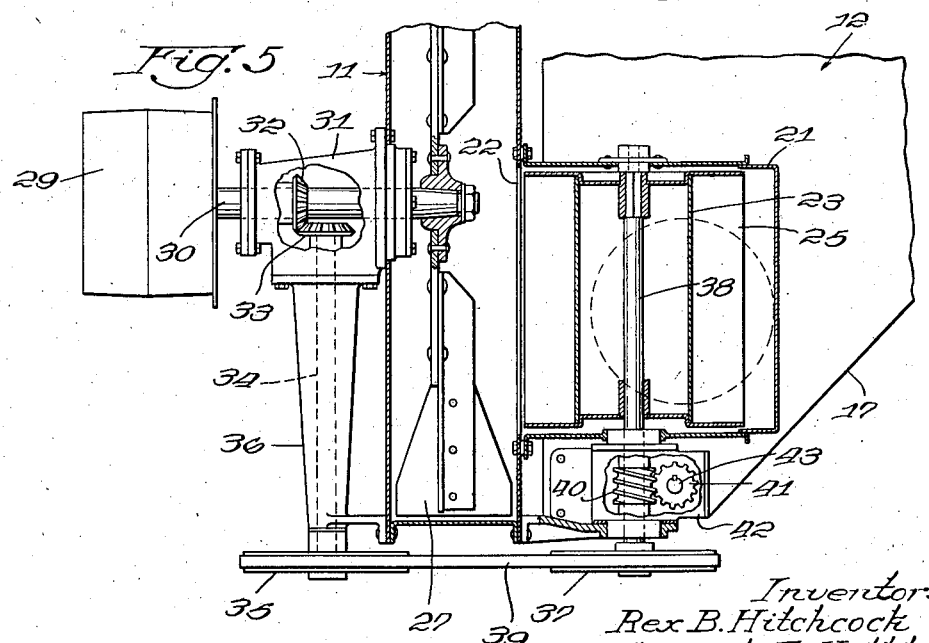
Inventors:
Rex B. Hitchcock and
Samuel E. Hilblom Patented Feb. 5, 1946

2,394,058

UNITED STATES PATENT OFFICE 2,394,058

ENSILAGE BLOWER

Rex B. Hitchcock, Evanston, and Samuel E. Hilblom, Chicago, Ill., assignors to International Harvester Company, a corporation of New Jersey Application July 22, 1944, Serial No. 546,143

6 Claims. (Cl. 302—37)

This invention relates to a new and improved ensilage blower and has for one of its principal objects the provision of means for uninterruptedly feeding ensilage to the blower.

An important object of this invention is to provide a feeding means for ensilage blowers which eliminates the possibility of the blower becoming clogged.

Another important object is the provision of a combination of material conveyors so arranged that, in spite of the fact that the feed trough for an ensilage blower is positioned parallel with the blower, the material is fed into the blower at right angles thereto.

Ensilage blowers are employed for the purpose of blowing cut and chopped ensilage up into a silo or other storage bin. It is customary to provide the ensilage blowers with a feed trough capable of receiving ensilage being discharged from a wagon or truck or the like, and thereupon feeding it into a blower and elevating the ensilage to a silo. The means employed in the trough for feeding the ensilage to the blower has usually taken the form of a slatted conveyor, the discharge end of which would live adjacent the blower. A serious problem of clogging the ensilage blower was always present in the machines of the type just described, for the reason that the entire mass of ensilage would proceed as a unit toward the opening in the blower fan housing. The result of this mass movement to the blower fan housing was, in effect, a sealing of the blower fan housing. This, of course, immediately prevented elevating of ensilage to the silo for the reason that conveying by blowing requires a continuous flow of air. In other words, the material to be elevated rides upwardly on and with the air being blown through the conduit. Therefore, when the air supply is cut off, the fan might continue to operate but will have no effect toward raising the ensilage.

It is, therefore, a further important object to provide means whereby the blower fan will be continuously supplied with air regardless of the rate at which the ensilage is fed to the blower fan.

Other and further important objects will become apparent from the disclosures in the following specification and accompanying drawings, in which:

Figure 1 is a front elevation of the ensilage blower of this invention;

Figure 2 is a top plan view of the ensilage blower as shown in Figure 1;

Figure 3 is a detailed sectional view taken on the line 3—3 of Figure 1;

Figure 4 is an end view of the ensilage blower as shown in Figures 1 and 2; and

Figure 5 is a sectional view taken on the line 5—5 of Figure 2.

As shown in the drawings:

The reference numeral 10 indicates generally a base on skids on which the ensilage blower of this invention is mounted. A blower fan housing 11 is located at one end of the base 10 and is positioned longitudinally thereof. A feed trough 12 lies adjacent the blower housing 11 and extends parallel thereto along the length of the skids 10. The blower housing is provided with an upwardly extending discharge port 13 upon which may be attached extension conduits leading to the top of a silo or the like.

The skids 10 are provided with upwardly inclined end portions 14 and at the top thereof are equipped with a hitch member 15. In order to transport this ensilage blower during short travels about the immediate farm, the hitch member 15 is raised and attached to the draw-bar of a tractor or the like. It will thereupon be seen that the machine will drag on its skids 10. This ensilage blower including the feed trough is a relatively narrow machine and is conducive to pulling on skids. Heretofore, it has been the general practice to have the feed trough positioned at right angles to the blower, and in that type of construction the machine was relatively wider and made transportation more difficult. For longer trips, of course, the device can be put on a truck. The feed trough shown is hinged to the fan housing for optional straight or right angle feeding. This feature is disclosed and claimed more specifically in our copending application entitled "Ensilage blower having feeding feed hopper" and having Serial No. 546,144.

The feed trough 12 has a relatively steep wall 16 lying adjacent the blower housing 11. The other side wall 17 of the trough 12 is inclined at an angle such as shown in Figure 5. This provides a wide opening for the top of the trough and insures ease of filling. An open-end auger 18 lies within the base portion of the trough and, by means of its spiral flights 19 is adapted to feed ensilage within the hopper or trough 12 in a direction longitudinally of the length of the trough and toward the blower housing 11. The discharge end 20 of the auger 18 is unsupported and unobstructed so that ensilage being moved within the trough by the auger will pass freely out of the end 20 of the auger and into a chamber 21 mounted over an opening 22 in the fan housing 11. The chamber 21 contains a vertically positioned fluted feed roll 23 adapted to rotate in the direction indicated by the arrow 24 as shown in Figure 3. The roll 23 has radially extending flutes or paddles 25. The housing 21 is circular in shape and conforms closely to the circumference of the fluted feed roll 23. The feed trough 12 is separate from the chamber 21 and is joined only through the restricted opening 26. This opening 26 is circular in shape and is only slightly greater in diameter than the diameter of the outer edges of the auger flighting 19. It is apparent that by restricting this opening 26 to such size the material admitted to the chamber 21 is limited to the amount carried within the circumference of the auger. This feature tends to prevent congestion within the blower.

As the ensilage leaves the discharge end 20 of the auger 18, it is forced through the opening 26 and is thereupon carried by the paddles 25 outwardly and thence around into the opening 22 in the fan housing 11. The ensilage material therefore enters the fan housing at right angles thereto in spite of the fact that the feed trough extends parallel to the fan housing.

The blower housing 11 contains a fan 27 which is adapted to receive material entering the opening 22 and throw it and blow it upwardly through the discharge port 13. As best shown in Figure 1, the side wall of the blower housing 11 has a plurality of small apertures 28 positioned above and to the left of the fluted feed roll compartment 21. These apertures insure a constant supply of air for the fan 27, and no reliance is made on air being admitted through the feed opening 22. The particular positioning of the apertures 28 permits the entrance of air without harmful effects toward fan operating efficiency. The fan 27 in its travel within the housing 11 picks up air as it passes the openings 28 and comes down and around and picks up ensilage as it is fed into the entrance 22, whereupon the combination of air and ensilage is thrown and blown upwardly out the discharge port 13.

The drive employed for the various elements, such as the auger, the feed roll and the fan, as shown, is received from the pulley 29 which is driven from a tractor power take-off pulley but may possibly be driven by some stationary engine or the like. The pulley 29 is mounted on and fastened to a shaft 30 which extends inwardly and at its opposite end supports the fan 27 within the housing 11. The shaft 30 is journaled within a suitable housing 31 which is fastened to the stationary blower housing 11. A bevel gear 32 is keyed or otherwise fastened to the shaft 30 within the housing 31. A cooperating bevel gear 33 is placed at right angles to the first bevel gear 32 and is also positioned within the supporting housing 31. The bevel gear 33 is keyed or otherwise fastened to a shaft 34 which projects downwardly and carries a V-belt pulley or the like 35 at its lower end. A downward extension 36 of of the housing 31 is adapted to journally support the shaft 34. A V-belt pulley 37 is mounted on the lower end of a shaft 38 upon which is fastened the feed roller 23. A V-belt 39 joins the pulleys 35 and 37 and thus transmits rotation from the drive pulley 29 to the feed roller 23. A worm 40 is keyed or otherwise fastened to the shaft 38 and is adapted to cooperate with a worm gear 41. These gears, namely 40 and 41, are mounted within a gear box 42. The worm gear 41 is keyed to a shaft 43 which extends lengthwise of the skids 10. This shaft 43 is joined by a universal joint 44 to an extension shaft 45 which is in turn joined by a universal joint 46 to a shaft 47. A sprocket 48 is keyed to the end of shaft 47. A second sprocket 49 is mounted on the end of the auger 18, and, by means of a chain 50, rotary drive is transmitted from the sprocket 48 to the sprocket 49.

It will be apparent that herein is provided a novel and efficient feed means for an ensilage blower. The device is well adapted to prevent congestion in the blower and guarantees feeding of the ensilage material at the proper angle with respect to the blower. Further, the apertures 28 in the wall of the fan housing 11 insures a continuous flow of air into the fan and thereupon a continuous flow of air under pressure to the silo-filling conduit.

What is claimed is:

1. In an ensilage blower comprising a fan housing, a feed hopper positioned parallel to said fan housing, a compartment intermediate and adjoining said fan housing and feed hopper, and a fluted feed roll positioned vertically in and journaled for rotation in said compartment for the purpose of transferring ensilage from the feed hopper to the fan housing.

2. An ensilage blower comprising a fan, a housing for said fan having an opening in the side, an elongated hopper positioned parallel to said fan housing, an auger within and extending longitudinally of said hopper for feeding ensilage, a compartment adjacent the discharge end of said hopper, and a vertically positioned fluted feed roll within said compartment adapted to receive ensilage from the hopper auger and feed it at right angles into said fan housing opening.

3. An ensilage blower comprising a fan, a housing for said fan having an opening in the side, an elongated hopper positioned parallel to said fan housing, an auger within and extending longitudinally of said hopper for feeding ensilage, a compartment adjacent the discharge end of said hopper, said compartment having a restricted opening in the side thereof to aline with said hopper auger, said compartment having a second opening adjacent said fan housing opening, and a vertically positioned fluted feed roll within said compartment adapted to receive ensilage from the hopper auger through the restricted opening in the compartment and feed it at right angles through the second opening in said compartment and into said fan housing through the opening in the side thereof.

4. An ensilage blower comprising a fan, a housing for said fan having an opening in the side, an elongated hopper positioned parallel to said fan housing, an auger within and extending longitudinally of said hopper for feeding ensilage, a compartment adjacent the discharge end of said hopper, said compartment having a restricted opening in the side thereof to aline with said hopper auger, said restricted opening being circular in shape and of a size only slightly greater in diameter than the diameter of the hopper auger, said compartment having a communicating passage with said fan housing opening, and a vertically positioned fluted feed roll within said compartment adapted to receive a moderate supply of ensilage from said hopper auger and feed it perpendicularly into said fan housing opening.

5. An ensilage blower comprising a fan, a housing for said fan having an opening in the side, an elongated hopper positioned parallel to said fan housing, an auger within and extending longitudinally of said hopper for feeding ensilage, a compartment adjacent the discharge end of said hopper, said compartment having a restricted opening in the side thereof to aline with said hopper auger, said compartment having a second opening adjacent said fan housing opening, and a vertically positioned fluted roll within said compartment adapted to receive ensilage from the hopper auger through the restricted opening in the compartment and feed it at right angles through the second opening in said compartment and into said fan housing through the opening in the side thereof, said fan housing having a second opening spaced from the compartment to maintain a supply of air for the fan.

6. In an ensilage blower comprising a fan housing, a feed hopper positioned parallel to said fan housing, a compartment intermediate and adjoining said fan housing and feed hopper, and a feed roll positioned vertically in and journaled for rotation in said compartment for the purpose of transferring ensilage from the feed hopper to the fan housing.

REX B. HITCHCOCK.
SAMUEL E. HILBLOM.